METHODS AND APPARATUS FOR VERIFYING THE OUTPUT OF AUTOMATIC PRINT READERS AND FOR CORRECTING ERRORS INTRODUCED BY THE PRINT READER

Filed March 10, 1966

INVENTOR.
WILLIAM B. MOORE
BY Harry A. Herbert Jr. and Herbert E. Farmer
ATTORNEYS United States Patent Office 3,439,986

Patented Apr. 22, 1969

3,439,986

METHODS AND APPARATUS FOR VERIFYING THE OUTPUT OF AUTOMATIC PRINT READERS AND FOR CORRECTING ERRORS INTRODUCED BY THE PRINT READER

William B. Moore, Rome, N.Y.
(Pinola Plantation, McClellanville, S.C. 29458)

Filed Mar. 10, 1966, Ser. No. 534,990
Int. Cl. G06k *9/08*
U.S. Cl. 356—71 6 Claims

ABSTRACT OF THE DISCLOSURE

An apparatus for verifying the output of automatic print readers and for correcting errors introduced by the print reader having an optical projector, an electronic character and page generator, and a readout device for receiving the optically projected and electronically generated information in an overlying relationship to provide direct comparison of the outputs.

The invention described herein may be manufactured and used by or for the United States Government for governmental purposes without payment to me of any royalty thereon.

This invention relates to apparatus for automatically reading printed and handwritten characters and more specifically, to methods and apparatus for verifying and correcting if necessary, the output of automatic print readers.

To explain the meaning of documents which are read by a print reader, it is necessary to realize that the document in its original form is generally only suitable for human use (it is handwritten, printed, typed, scribed, etc.). A print reader is a device which transforms the original document into a form suitable for use in information-processing/computing-machinery (i.e., alpha/numeric and symbology in "machineable" form). The "Characters" comprising a document refers to any word, number, symbol or group of symbols pertaining to any language, printed, typed or written or in any form presenting a distinctive physical appearance.

Conventional methods of error correction and validation require that a human read the original document and the symbolic representation of that document after transformation, in their totality. And as errors (i.e., differences) are found enter the correction. This approach is time consuming and imperfect as is readily demonstrated in proofreading the printed version of a book or document. For example, many errors in newspapers are not "caught" by the proofreader.

Also, prior art methods typically require that the entire language dictionary (including word endings) be stored, searched and compared against each word which is outputted from a print reader. This consumes large amounts of computer time, and does not correct those ambiguous cases where a character error produces another word which is valid, but not for the sentence in which it is located.

Accordingly, the primary object of the present invention is to provide a method whereby verification of print reader accuracy can be accomplished rapidly.

Another object of the present invention is to provide a method whereby any errors introduced by the print reader can be corrected rapidly.

A still further object of the present invention is to provide apparatus whereby rapid validation of print reader accuracy and correction of any errors introduced by the print reader can be accomplished.

To the attainment of the foregoing and additional objects, the instant invention comprehends the utilization of an optical-electronic comparator for the verification of the output of automatic print readers. The basic elements of the optical-electronic comparator include an optical projector, an electronic character and page generator, and any type of presentation device on which optically projected and electronically generated invention may be presented simultaneously, overlaid one on the other, for direct comparison.

Other objects, features and advantages of the invention will be best understood by the following description and by reference to the accompanying drawings illustrating by way of example specific embodiments of the invention, wherein.

Figure 1:
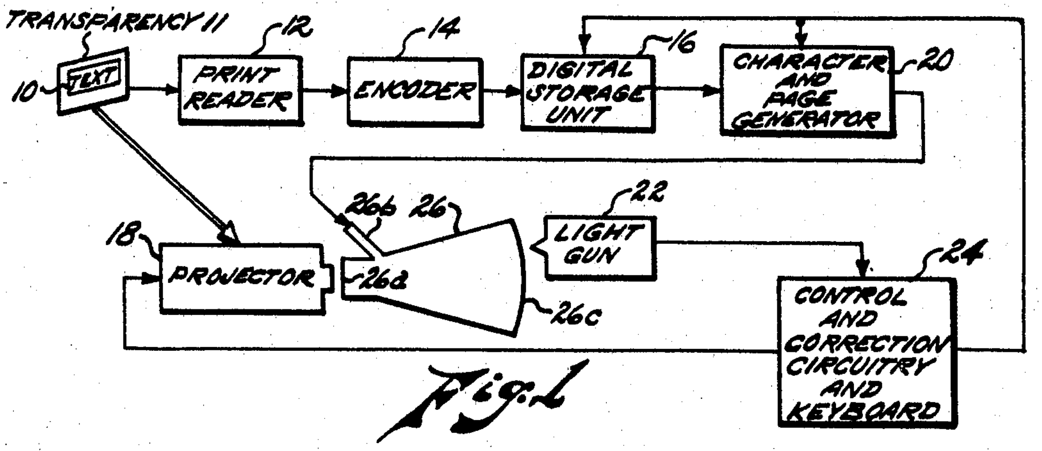
FIGURE 1 illustrates an embodiment utilizing an on-axis ported cathode ray tube.

Now referring to FIGURE 1, illustrated is one arrangement of elements for verifying the output of an automatic print reader. Input text material 10 is in the form of an optical transparency, mounted in any convenient fashion, for example, aperture cards, 2 x 2 film mounts, film strips, 70 mm. chips, etc. Usually, the original document is microfilmed either before or after the data transformation process; for example, banks typically make microfilm copies of all checks and transactions. The image of transparency 11 is then transmitted to print reader 12 where the verification processing takes place.

The input image from transparency 11 is "read" by print reader 12. The information output from print reader 12 is encoded into primary digital form by encoder 14 and stored digitally in stored unit 16.

Input transparency 11 is then transported to projector 18 either immediately or at a convenient time if batch verification is desired. The image from projector 18 is focused through optical window 26*a* of cathode ray tube 26. Tube 26 is the on-axis type manufactured by such companies as Bunker-Ramo, Stromberg Carlson, General Electric and Westinghouse. Digital data from digital storage unit 16 is reconverted to a visual form by character and page generator unit 20 which justifies the lines in the same manner as the input lines. Also, character generator 20 duplicates the font of the input characters so that the two images will coincide. The signals from generator 20 are fed to port 26*b* of cathode ray tube 26.

It is to be noted that specific information must be available from print reader (data conversion or transformation device) 12 to accurately reflect: font, orientation, skew, rotation, and other significant and unique characters of each symbol of the data being converted. This data exists in automatic print readers of the type manufactured by companies such as Philco, Farrington, I.B.M. or Control Data Corporation.

The above referenced symbol "uniquenesses" are necessary because the instant method provides for error correction or validation of this conversion process by superimposing in the same plane (mathematically speaking) the result of the conversion process with the source document. The more precise the alignment occurs, the better the instant method works. It will work quite well with some misalignment.

In the event that characters are incorrectly read by print reader 12, the images fed into ports 26*a* and 26*b* of cathode ray tube 26, when superimposed on face 26*c*, will not coincide and any errors may be readily observed. To aid in the recognition of errors, any of a number of techniques taught by the instant invention may be implemented. For example, referring to FIGURE 4, if all data presented by source (a) is superimposed with that presented by source (b), and the interval of time of display is say 1/40 sec., an observer will see or perceive one of the following cases:

(1) If (a) and (b) are identical, i.e., no errors, the superimposed displays will be at a rate which is twice the rate of either (a) or (b), independently, and a static presentation will occur, i.e., an observer will see the document at a recurring rate of 40 times/sec., which is above the human flicker frequency threshold.

(2) If (a) and (b) are different, i.e., an error occurred in the conversion process; two phenomenon occur, (A) All things which are the same will be viewed at twice the rate of either (a) or (b) and will be static as in (1) above, (B) While those specific items or symbols which are different, i.e., errors, will appear at either the rate of (a) or (b), [(a) and (b) can be equal] and an observer will perceive "flicker." Symbology which does not "flicker" validates the conversion process (no errors occurred), and symbology which does flicker is corrected by the observer. The correction is then validated, and the validated data is ready for routine processing by a utilization device.

Figure 4:
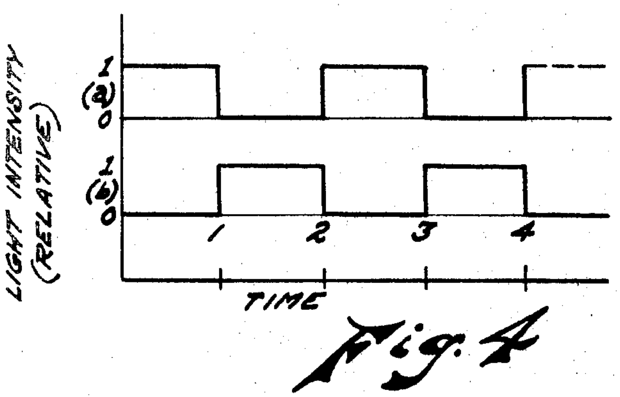
FIGURE 4 illustrates the time sequence of a particular embodiment.

It is to be noted that the time intervals between units 1, 2, 3, etc., in FIGURE 4 are variable, but are generally in the range of 1/10 to 1/60 of a second. For example, the CRT refresh rate may be chosen as one half the flicker threshold, say 15 cycles/second, and the optical image may be made to flicker at the same rate, but out of phase. Where the two images coincide, the symbols appear flicker free; where they differ, flicker is present.

Another technique for observing errors utilizes differential colors. In this technique, the interlocking of separate images in the time domain for "flicker" is not required, i.e., the two displays are presented continuously, except the two images are of selected different colors. For example, if the symbology from the original document is displayed red and the symbolic representation after conversion is displayed orange, all symbols which are error free will appear white; those symbologies with errors appear either red or orange, depending on whether these errors are of commission or omission. However, the selected colors need not be complementary; in this case the color of the correctly read symbols will be the additive combination of the two selected colors. It is to be noted that it is possible to use a combination of "flicker" and "differential colors" for selected problems. Although, the instant method takes advantage of two human perceptions, or sensory capabilities, they are not necessary for the implementation of the method.

Figure 2:
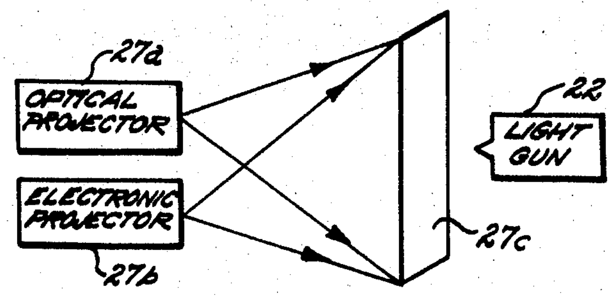
FIGURE 2 illustrates an embodiment utilizing two projectors, one optical and one electronic.
Figure 3:
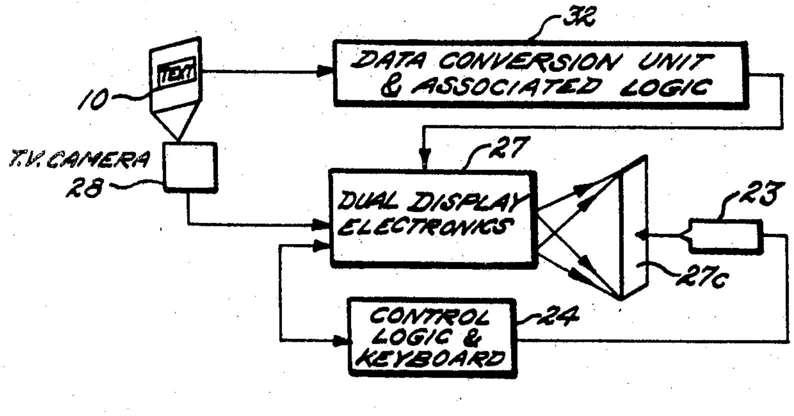
FIGURE 3 illustrates another embodiment which does not require a transparency.

The mode of operation of FIGURE 3 is basically the same as the system illustrated in FIGURE 1 with the exception that a transparency is not required. Test 10 is scanned by high resolution TV camera 28 and fed to dual display electronics unit 27. Test 10 is also read by data conversion and associated logic unit 32. FIGURES 2 and 3 illustrates how ported tube 26 can be replaced with two projectors, optical projector **27*a* and electronic projector 27*b***.

Control and correction circuits 24 for correcting characters may be provided as shown in FIGURES 1 and 3. Selection of characters to be corrected may be made using a light-gun or electronic cursor; correct characters are then entered by keyboard. Light gun 22 may be of the type described in U.S. Patent No. 2,903,690, granted to Frederick S. Slack on Sept. 8, 1959. The keyboard may be of the type manufactured by the Bunker-Ramo Corporation as may be the light gun. Actually, any electronic pointer can be used to transmit the error symbol identification data to control and logic unit 24.

In summation, it has been shown how an unskilled person need only "glance" at a page of information-regardless of what language the text is in, identify "flicker" or color differences and "point" by some means to the "error." Electronic circuitry then removes or positions the identified symbol, namely, the one which is an incorrect result of the transformation process. The correct symbol from the original document, which is still being presented, is inserted through a typewriter keyboard (or some other means such as even a steno writer). The inserted symbol then can appear via conventional display electronics on display surface **26*c*** at some convenient predetermined location (e.g., at the vacated location of the error symbol, at the end of the line of symbols, at the bottom of the display surface, in the context of original document) and this insertion is then validated. After error correction and validation, the next error is identified; or if none, the system is informed that the rest of the "page" (those symbols, etc. being verified) are correct, and moves on to the next page.

Although there have been described above and illustrated in the drawings various exemplary arrangements in accordance with the invention, it will be appreciated that the invention is not limited thereto. Accordingly, the invention should be taken to include all variations, modifications and alternate arrangements falling within the spirit and scope of the appended claims.

What I claim:

1. The method of validating the output of an automatic print reader of an original document comprising the steps of scanning the original document with the print reader to provide an output signal, converting said output signal into an electronically converted document, said electronically converted document being electronically converted data representing the image of said electronically converted document, optically scanning said original document to provide an image of said original document, optically projecting on a surface the image of the original document to be read, projecting on the same surface the image of the electronically converted document, produced by said print reader, and validating said original document by superimposing said original and converted images upon said same surface and detecting any differences or errors therein.

2. The method as described in claim 1 wherein said step of superimposing further includes the steps of displaying the image of said original document at a predetermined recurrence rate, displaying the image of said electronically converted data at the same recurrence rate and interlocking said displays in the time domain, whereby a static presentation occurs when there are no errors in the converted data and flicker occurs when there are any errors.

3. The method of claim 1 wherein said step of superimposing comprises the steps of continuously using one color to display the image of said original document, reading said original document with a conversion device, continuously using a color different from said first mentioned color to display the output of said conversion device, and overlaying, on the same surface simultaneously, said images, one on the other, whereby a uniform color appears when the conversion data is free from errors and color fringing occurs when any errors are present in the output data of said print reader.

4. The method of claim 1 which includes the further steps of removing any error signals occurring, with a sensing means, processing the error signals to provide the correct symbol, and inserting the correct symbol in the previous error location by a control and logic means.

5. The method of claim 4 which further includes the steps of validating any corrections made, by superimposing the images of said electronically converted document and said original document on the same surface and verifying the correspondence of the images.

6. Print reader verifying and error correction apparatus comprising a print reader for reading an original document, encoding means connected to said print reader for converting the output of said print reader into digital data, means for transmitting an optical image of said document to be read to said print reader, digital storage means connected to said encoding means, means for projecting an optical image of said original document, optical-electronic comparator means for superimposing the output from said print reader apparatus and the optical image of said original document, means for transmitting the output from said print reader to said optical-electronic comparator means, and means for correcting any errors which occur in the output from said print reader apparatus.

References Cited

UNITED STATES PATENTS

| | | | |
|---|---|---|---|
| 3,290,546 | 12/1966 | Link et al. | 340—149 |
| 3,202,761 | 8/1965 | Bibbero | 340—149 |

NORTON ANSHER, *Primary Examiner.*

R. M. SHEER, *Assistant Examiner.*

U.S. Cl. X.R.

353—121; 340—149